United States Patent [19]

Kim

[11] Patent Number: 4,695,906
[45] Date of Patent: Sep. 22, 1987

[54] APPARATUS FOR QUICK STARTING TAPE IN VIDEO CASSETTE RECORDERS

[75] Inventor: Jin H. Kim, Seoul, Rep. of Korea

[73] Assignee: Samsung Electronics Co., Ltd., Suwon, Rep. of Korea

[21] Appl. No.: 813,613

[22] Filed: Dec. 26, 1985

[30] Foreign Application Priority Data

Dec. 28, 1984 [KR] Rep. of Korea .................. 1984-8495

[51] Int. Cl.$^4$ ...................... G11B 5/027; G11B 15/665
[52] U.S. Cl. ......................................... 360/85; 360/95
[58] Field of Search .............................. 360/84, 85, 95

[56] References Cited

U.S. PATENT DOCUMENTS 4,121,267 10/1978 Hayashi .................................. 360/85
4,425,590 1/1984 Johnstone .......................... 360/95 X Primary Examiner—John H. Wolff
Attorney, Agent, or Firm—Oblon, Fisher, Spivak, McClelland & Maier

[57] ABSTRACT

An apparatus for quick starting of tape forwarding-and-rewinding operation for video cassette recorders, wherein fast-forwarding or rewinding operation of a video tape can be quickly started, because loading plates, which are locked in loading holes as during the recording or reproducing operation, keep the tape being loaded on a head drum, while the tape can be wound by only the driving force to rotate one of the reel discs, because two guide grooves in different shapes are provided on upper and lower surfaces of a cam gear and so a tension pole and a pinch roller come off the tape and the tape gets out of touch with various fixed posts in its travelling route, before the fast-forwarding or rewinding operation is started.

1 Claim, 7 Drawing Figures

APPARATUS FOR QUICK STARTING TAPE IN VIDEO CASSETTE RECORDERS

BACKGROUND OF THE INVENTION

1. Field of the Invention

The present invention relates to an apparatus for quick starting of tape forwarding-and-rewinding operation for video cassette recorders (hereinafter called as VCR), wherein forwarding or rewinding operation of a video tape can be quickly started and performed as the tape is kept being loaded.

2. Description of the Prior Arts

Among the conventional tape loading systems of VCR for home use, μ-loading and M-loading are important.

In μ-loading system, the tape can be fast-forwarded or rewound without being unloaded and so one can save time to search for a desired part of the tape, while it has a relatively slow speed as compared with the M-loading system when it is recorded or reproduced.

In spite of the advantage described above, μ-loading system has many disadvantages. The system must have a relatively complicated structure consisting of lots of parts to slow down the tape's speed.

Furthermore, each of several fixed pins requires hard and difficult precision machining in order to prevent any possible damages to the pins and to the tape which may occur due to the friction between the tape and the pins when the tape is fast-forwarded or rewound without being unloaded. Meanwhile, even though the precision machining of the pins is possible, perfect prevention of such damages is difficult to be achieved because the pins have to stand a long life span of VCR.

The M-loading system also has some defects. In the M-loading system, it takes a long time to search for a scene in the tape because the tape should be released from the loaded state before the operation of fast-forwarding or rewinding begins. This is due to the fact that the tape travels on a route of "S" shape and the tape is apt to be damaged as it may slip off the loading guides because the fast speed of the tape during the rewinding or fast-forwarding operation in loaded state increases the tension and vibration of the tape.

It has been known that it is desirable to decrease the inclination angle of the head drum to the least possible value, in order to solve the aove problems. But, the angle can not be decreased below 9 degrees, as long as the entire loading structure is to be simple.

SUMMARY OF THE INVENTION

Considering the above problems, the inventor has found that it is appropriate that the head drum has an inclination angle of 10 degrees for making the tape travel a smooth route made of obtuse angles and thereby securing the tape a relatively smooth travelling. The tape is, however, desired to keep away from being contacted with the fixed pins in its travelling routes so that fast-forwarding or rewinding operation of the tape may be started as the tape is loaded on the head drum and also the tape may be wound rapidly. That's because the tension of the tape increases up to 10% in comparison with the reproducing state when it is being wound on the reel, and therefore the tape can not be rapidly wound (that is, fast-forwarded or rewound) by a driving force to rotate each of the reel discs of VCR.

OBJECTS OF THE INVENTION

The primary object of the present invention is to make quick starting of tape forwarding or rewinding operation possible with the tape loaded on the head drum.

Another object of this invention is to make it possible to wind the tape in the loaded state during the fast-forwarding or rewinding operation by using only the rotating force of the reel disc.

Still another object of this invention is to reduce the degree of friction between the tape and various parts of VCR to the least possible value by allowing the tape to come in contact with the rotating parts and only the least number of the fixed pins.

BRIEF DESCRIPTION OF THE DRAWINGS

The present invention will be described more in detail only by way of a preferred embodiment with reference to the accompanying drawings wherein.

DETAILED DESCRIPTION OF THE PREFERRED EMBODIMENT

Figure 1:
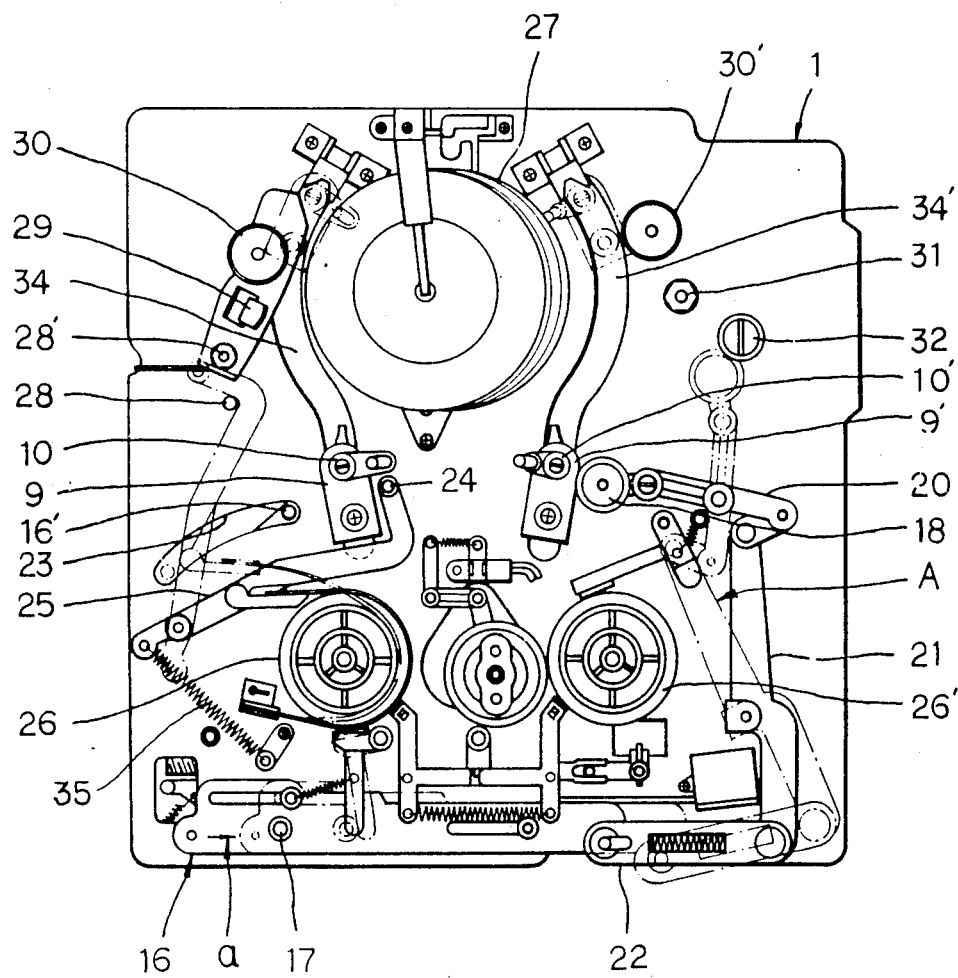
FIG. 1 shows a plan view of a preferred embodiment of the apparatus according to the present invention.
Figure 2:
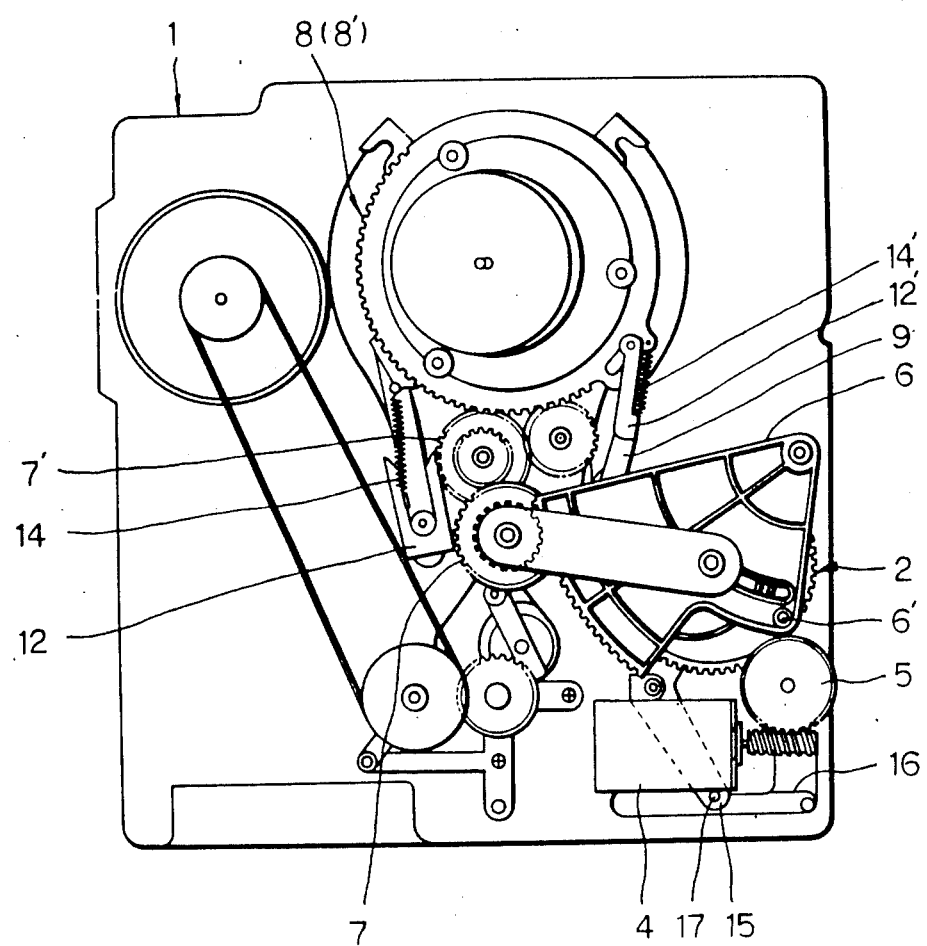
FIG. 2 is a bottom view of the apparatus of FIG. 1.
Figure 3:
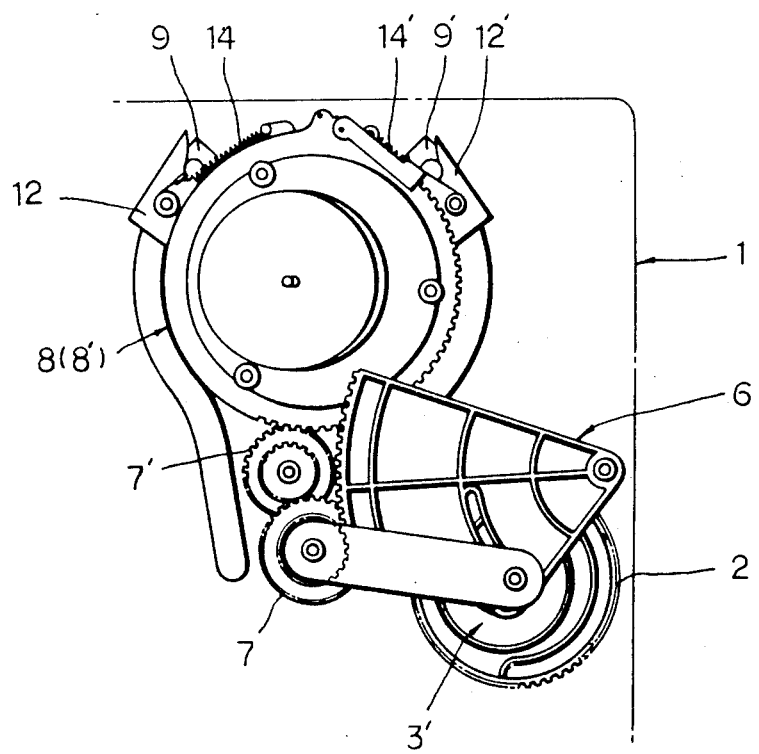
FIG. 3 illustrates a partially broken bottom view of the apparatus of FIG. 1 when the tape-loading is completed.

A preferred embodiment according to the present invention comprises a cam gear 2 which is mounted under the main deck 1. The cam gear 2 through a connecting gear 5 by a loading motor 4 and has guide grooves 3, 3' at its bottom and top. A sector gear 6 is rotated by means of a guide pin 6' captured in the guide groove 3' and in turn rotates ring gears 8, 8' through transmission gears 7, 7. Loading plates 9, 9' having loading rollers 10, 10' and loading poles 11, 11' are elastically connected to the ring gears 8, 8' by tension springs 14, 14'. The loading plate 9, 9' are also additionally connected to the ring gears 8, 8' by supporting plates 12, 12' and connecting pins 13' inserted in openings 13 formed in the ring gears 8, 8'. The loading rollers 10, 10' and the loading poles 11, 11' are exposed above the main deck 1 through loading holes 34, 34' formed in the main deck 1. An operating rod 15 carries a guide pin 15' (shown in FIG. 5(B)) which is captured in the guide groove 3. The operating rod 15 is connected to a slide plate 16 on the main deck 1 by a connecting pin 17. The front end of the slide plate 16 is connected to a tension rod 21 through a connecting rod 22. A pinch arm 20 is provided with a pinch roller 18 and a guide roller 19 on each end of it and operated by the tension rod 21. A guide pin 16' is installed on the front end of the operating rod 15 and protrudes above the main deck 1 through a guide hole 23. The guide pin 16' guides a tension arm 25 with a tension pole 24.

In the drawings, reel discs 26, 26', a head drum 27, fixed guide pins 28, 28', a full erasing head 29, guide rollers 30, 30', a fixed pin 31, a capstan 32, and a tape 33 are also shown.

Now, the operation of the apparatus according to the present invention will be described.

As a video tape cassette is placed on the main deck 1, a switch turns on and thereby operates the loading motor 4. The loading motor 4 rotates the cam gear 2 through the connecting gear 5. At this time, the operating rod 15 and the sector gear 6 operate simultaneously, since both of them are operated by the guide pins 15', 6' inserted in the guide grooves 3, 3' of the cam gear 2. The slide plate 16, which is connected to the end of the operating rod 15 by the connecting pin 17, moves toward the right side in the direction of the arrow 'a' in FIG. 1 and pushes the connecting rod 22. The connecting rod 22 in turn pushes the lower end of the tension rod 21, making the upper end of it move toward the position as indicated by an imaginary line A. This makes the pinch arm 20 move, and the pinch roller 18 connected to the pinch arm 20 moves towards the capstan 32. Meanwhile, the sector gear 6 makes the transmission gears 7, 7' operate by turns, causing the ring gears 8, 8' to revolve. Then, the loading plates 9, 9' move along the loading holes 34, 34' provided around the head drum 27, whereby the loading rollers 10, 10' and the loading poles 11, 11' draw out the tape 33 from the cassette and load it on the head drum 27. At this time, the tension arm 25 is released from the loading plate 9, and the front end of the tension arm 25 moves towards the left in FIG. 1 under the influence of the straining power of a tension spring 35 installed on the rear end of it. The tension arm 25 meets the guide pin 16' provided on the operating rod 15 and moving in the guide hole 23. The tension arm 25 is guided so that the tension pole 24 on its front end may enter the space between the two fixed guide pins 28, 28', carrying the tape 33 and giving a tension to the tape 33.

In the tape loading operation described as above, the process until moving of the loading plates 9, 9' up to the ends of the loading holes 34, 34' is the same as in the loading system of the conventional VCRs. However, the rest of the tape loading operation is achieved through a distinct process by the present invention, as will be described below.

Figure 4:
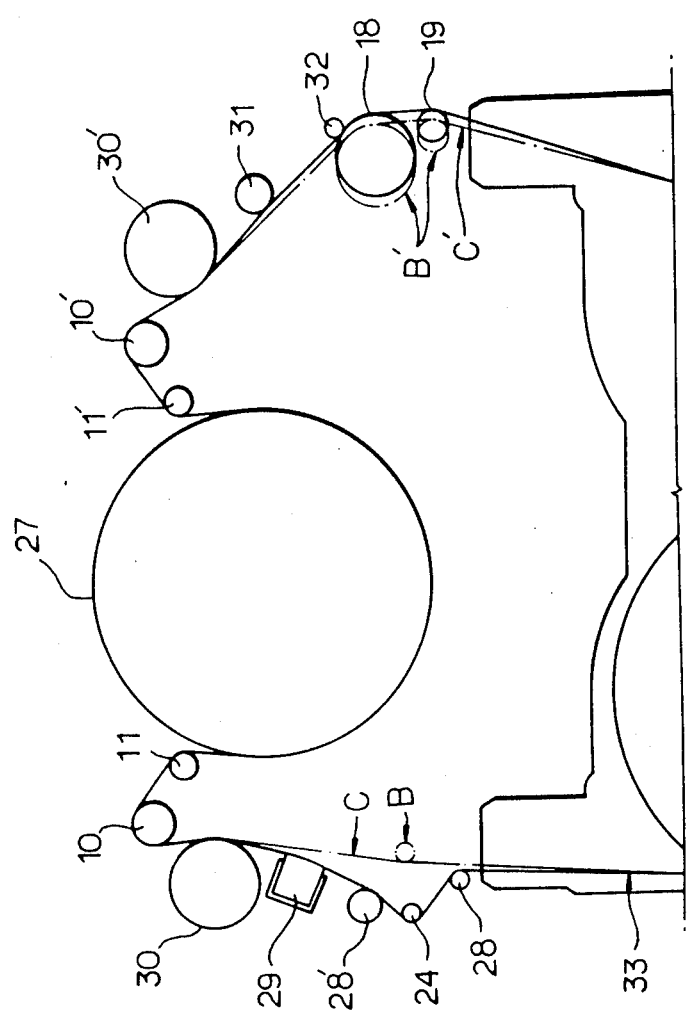
FIG. 4 explains the paths on which the tape travels when the apparatus of FIG. 1 is operated.
Figure 5A:
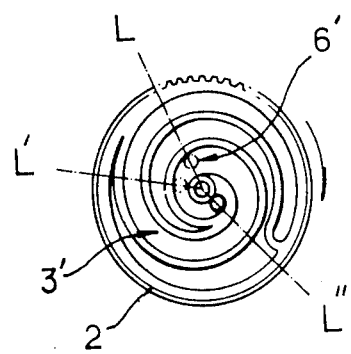
FIGS. 5(A) and (B) are respectively a bottom view and a plan view of a cam gear used in the apparatus of FIG. 1.
Figure 5B:
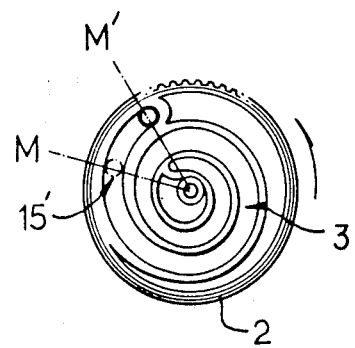

When the loading plates 9, 9' meet the ends of the loading holes 34, 34' and can not move further, the pinch roller 18 and the guide roller 19 of the pinch arm 20 as well as the tension pole 24 reach the positions indicated as the imaginary lines B, B', keeping two sides of the tape 33 in the locations shown as the imaginary lines C, C' (see FIG. 4). At this time, the guide pin 15' of the operating rod 15 and the guide pin 6' of the sector gear 6, inserted respectively in the guide grooves 3, 3', reach the locations M, L respectively, after running along the grooves 3, 3', as shown in FIGS. 5(A) and (B).

Figure 6:
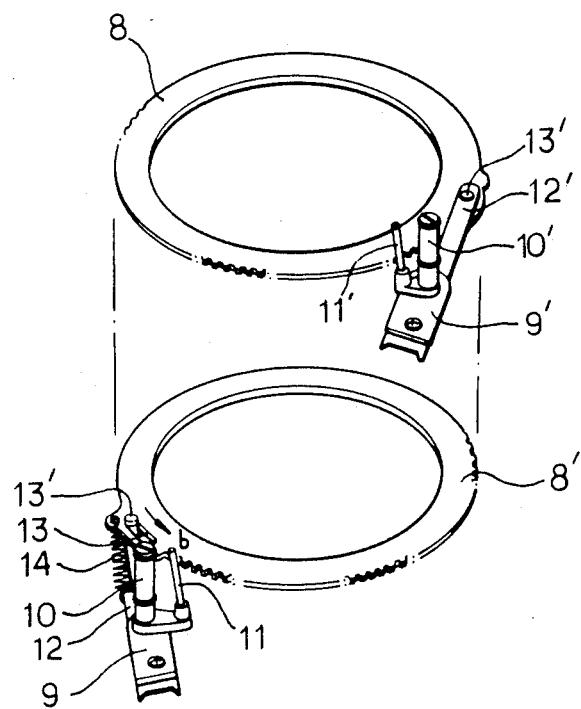
FIG. 6 shows an extracted perspective view of ring gears used in the apparatus of FIG. 1.

As the loading motor 4 keeps rotating as designed, the cam gear 2 also keeps operating and makes the sector gear 6 and the operating rod 15 continue their movements. Though the loading plates 9, 9' with the loading rollers 10, 10' can not move further as described above, the ring gears 8, 8' can rotate a little further because the guide pin 6' of the sector gear 6 moves from the location L to the location L', making the sector gear 6 and the transmission gears 7, 7' operate to that extent. Accordingly, the connecting pins 13' on the supporting plates 12, 12' slide back from the front ends to the rear ends of the openings 13 respectively as indicated by an arrow 'b' in FIG. 6. At the same time, the tension springs 14, 14', the two ends of which are caught on the ring gears 8, 8' and the loading plates 9, 9', respectively, are strained and extended to that extent.

As the tension springs 14, 14' are stretched, their tension increases, and therefore the springs 14, 14' can thrust the loading plates 9, 9', having the the loading rollers 10, 10' and loading poles 11, 11', close to the front walls of the loading holes 34, 34', having them locked to those walls.

Even after completion of such additional operation, the cam gear 2 keeps rotating and makes the guide pin 6' slide from the location L' to the location L" in the guide groove 3'. However, such sliding movement in the groove 3' between L' and L" by the guide pin 6' does not make the sector gear 6 move any further, and the ring gears 8, 8' accordingly do not revolve any more, because the part between the locations L' and L" in the groove 3' is a concentric arc.

While the guide pin 6' can not operate the sector gear 6 as above described, the guide pin 15' can make the slide plate 16 continue to move with the operating rod 15, because the guide pin 15' slides in an eccentric arc of the guide groove 3 between the locations M and M'. As a result, the pinch roller 18 of the pinch arm 20 is moved a little further to the position indicated by solid lines from the position B' as shown in FIG. 4 to press the loaded tape 13 to the capstan 32, while the guide roller 19 of the pinch arm 20 also further moves in the same manner as the pinch roller 18 and pushes the loaded tape 33 transversely to give it the elasticity. Besides, the tension arm 25 also continues to move to the left in FIG. 4, and the tension pole 24 on the front end of the tension arm 25 moves from the position B further to the left of it. Accordingly, a part of the loaded tape 33 is pushed toward the outsides of the fixed guide pins 28, 28' by the tension pole 24 as shown in FIG. 4. Consequently, the loaded tape 33 gets the elasticity as it runs through the fixed guide pins 28, 28' and the tension pole 24, in addition to the elasticity given by the pinch roller 18 and the guide roller 19.

As described above, the tape loading process according to the present invention has two steps. The first step is the primary loading process until the ring gears 8, 8' stop rotating and the second step is the subsequent loading process until the pinch roller 18 and the tension pole 24 make the additional movements. Accordingly, the loaded tape 33 travels in the same way as in the conventional VCRs when it is recorded or reproduced, but the situation is different in the fast-forwarding or rewinding operation.

When a switch for the fast-forwarding or rewinding operation is turned on, the loading motor 4 starts to rotate in the reverse direction compared with the tape loading process, making the cam gear 2 rotate reversely, too. The cam gear 2 rotates reversely as long as the guide pin 6' moves back along the concentric arc of the guide groove 3' from the position L" to the position L' and the guide pin 15' moves along the eccentric arc of the guide groove 3 from the position M' to the position M.

While the guide pin 6' moves back as described above, the sector gear 6 does not operate because the guide pin 6' travels in the concentric arc, and therefore the loading plates 9, 9' maintain their fixed positions, keeping the tape 33 in the loaded state.

However, the operating rod 15 moves back and pushes the tension arm 25 and the tension pole 24 together to the right in FIG. 1 with its guide pin 16', when the guide pin 15' travels in the above-mentioned eccentric arc of the guide 3. As the tension pole 24 is pushed to the position B in FIG. 4, the tape 33 comes to the location C, leaving and becoming free from the fixed guide pins 28, 28' and the full erasing head 29. The pinch roller 18 and the guide roller 19 of the pinch arm 20 which is operated through the connecting rod 22, the tension rod 21, and the slide plate 16 actuated by the operating rod 15, also come back to the position B'. In other words, the pinch roller 18 comes off the capstan 32, and the tape 33 gets out of touch with the capstan 32 and the fixed pin 31.

Consequently, the tape 33 passes through the outside of the tension pole 24, the inside of the guide roller 30, the outsides of the loading roller 10, the loading pole 11, and the head drum 27, the outsides of the loading pole 11' and the loading roller 10, the inside of the guide roller 30', and the outside of the pinch roller 18 and the guide roller 19 one by one. That means that the tape 33 can travel, touching the rolling posts such as the guide rollers 30, 30', the loading rollers 10, 10', the pinch roller 18, and the guide roller 19 but without touching the fixed posts such as the fixed guide pins 28, 28' and the fixed pin 31. As a result, the fast-forwarding or rewinding operation of the tape 33 can be started quickly without unloading the tape 33 and only with the rotating force of one of the reel discs 26, 26'.

As described above, the apparatus by the present invention makes it possible to rapidly fast-forward or rewind the tape 33 in the loaded state by using only the rotating force of the reel discs 26, 26', preventing any possible damages to the tape 33, while the tension springs 14, 14', caught on the ring gears 8, 8' and the loading plates 9, 9', lock the loading plates 9, 9' to the front walls of the loading holes 34, 34', protecting the loading plates 9, 9' from being swayed by the tension produced when the tape 33 is rewound or fast-forwarded. If the "play" switch of VCR is turned on after the completion of the fast-forwarding or rewinding operation in order to search for the picture the user wants, the tension pole 24 and the pinch roller 18 will move to the left and the right respectively as shown in FIG. 4, giving the tape 33 proper tension and pressing the tape 33 against the capstan 32, and the reproduced pictures can be enjoyed normally.

As can be seen from the above description, the apparatus according to the present invention has a relatively simple structure in comparison with the conventional μ-loading system, and the user need not unload the tape for the fast-forwarding or rewinding operation, saving the time and process which are essential to the M-loading system. Such advantages have been realized by providing the guide grooves 3, 3' in different shapes on the upper and lower surfaces of the cam gear 2 in order to make the tension pole 24 and the pinch roller 18 come off the tape 33 and thereby to cause the tape 33 to get out of touch with various fixed posts in its travelling route, before the fast-forwarding or rewinding operation is started and by keeping the tape 33 being loaded on the head drum 27 with the loading plates 9, 9' locked in the loading holes 34, 34'.

Although the present invention has been described with respect to the preferred embodiment constructed in accordance therewith for the purpose of illustrating the manner in which the invention may be used to advantage, it will be apparent to those skilled in the art that various variations, modifications, equivalent arrangements or improvements may be made without departing from the scope and spirit of the invention. Accordingly, it will be appreciated that the invention is not to be limited by the specific embodiment herein, but only by the scope of the appended claims.

What is claimed as new and desired to be secured by Letters Patent of the United States is:

1. An apparatus for quick starting of tape forwarding-and-rewinding operations for a video cassette recorder, said apparatus comprising:
   (a) a cam gear (2) which is mounted under the recorder main deck (1), rotates through a connecting gear (5) by a loading motor (4), and has guide grooves (3, 3') at its bottom and top surfaces;
   (b) a sector gear (6) which is rotatable by means of a guide pin (6') captured in the said guide groove (3') and in turn rotates ring gears (8, 8') through transmission gears (7, 7');
   (c) loading plates (9, 9') having loading rollers (10, 10') and loading poles (11, 11') which are elastically connected to the said ring gears (8, 8') by tension springs (14, 14') and also additionally by supporting plates (12, 12') and connecting pins (13') inserted in openings (13) formed in the said ring gears (8, 8'), the said loading rollers (10, 10') and loading poles (11, 11') being exposed above the recorder main deck (1) through loading holes (34, 34') formed in the recorder main deck (1);
   (d) an operating rod (15) which has a guide pin (15') captured in the guide groove (3) and is connected to a slide plate (16) above the recorder main deck (1) by a connecting pin (17), the front end of the slide plate (16) being connected to the tension rod (21) through a connecting rod (22);
   (e) a pinch arm (20) which is formed with a pinch roller (18) and a guide roller (19) on each end of it and operated by the said tension rod (21); and
   (f) a guide pin (16') which is installed on the front end of the operating rod (15) and protrudes above the recorder main deck (1) through a guide hole (23), the said guide pin (16') serving to guide a tension arm (25) with a tension pole (24).

* * * * *